Figure 5:
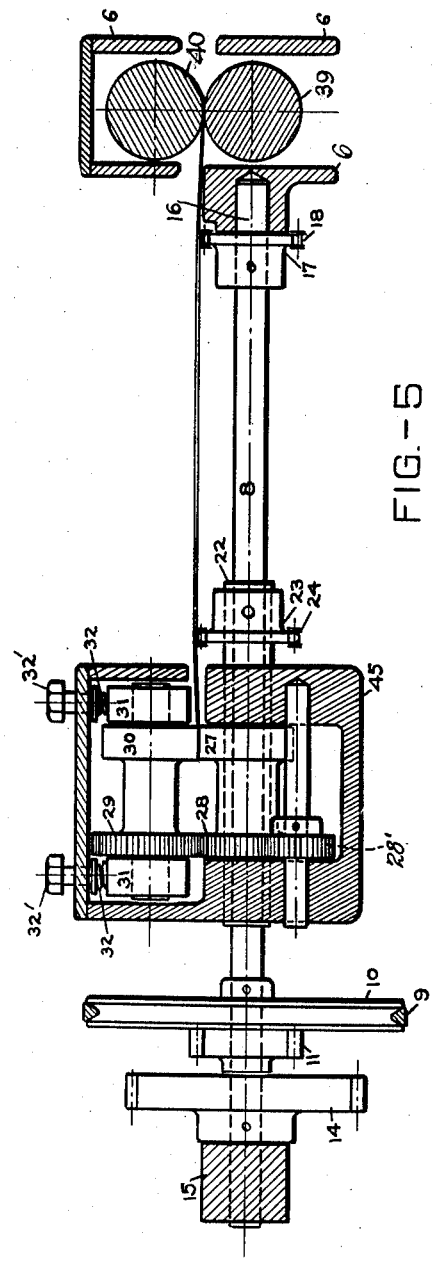

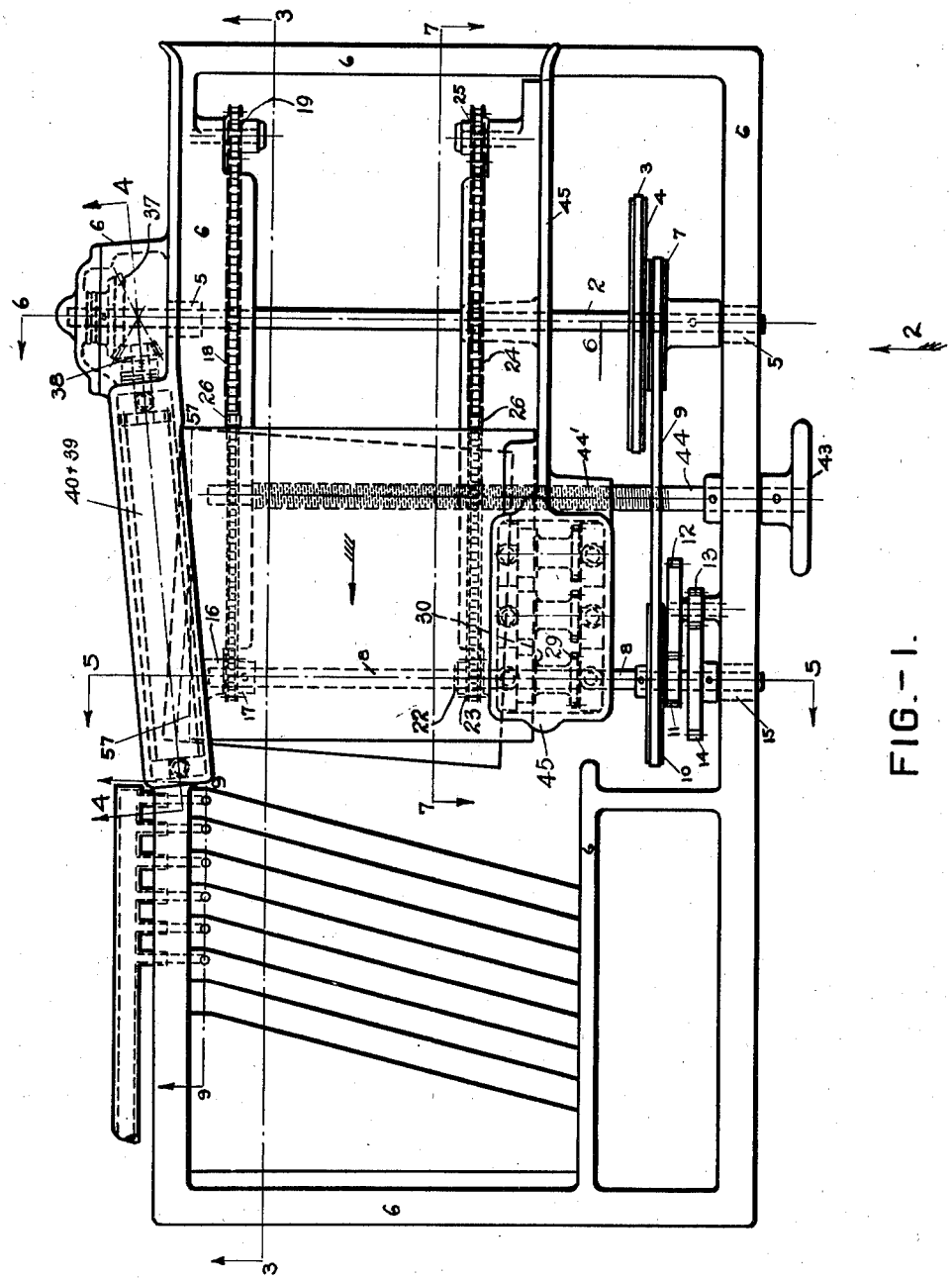

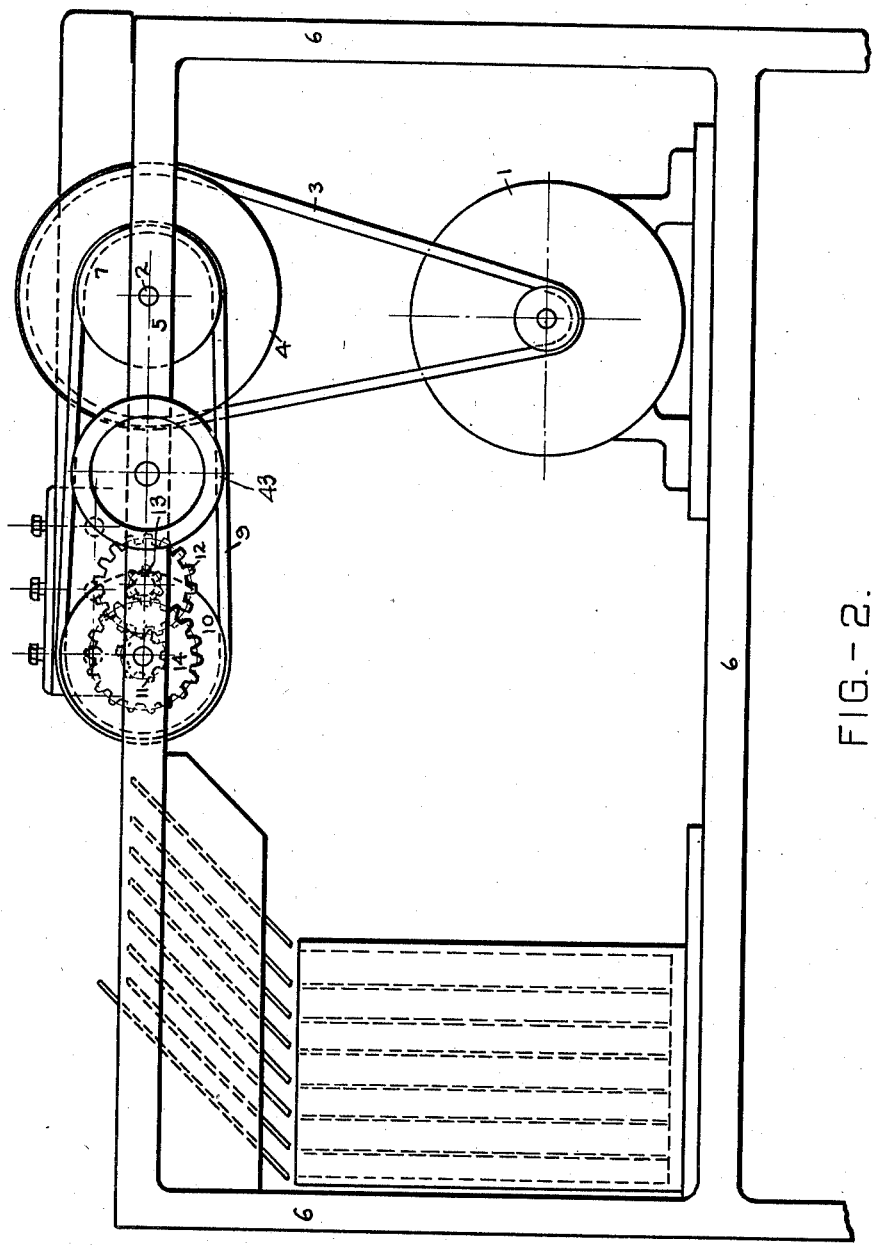

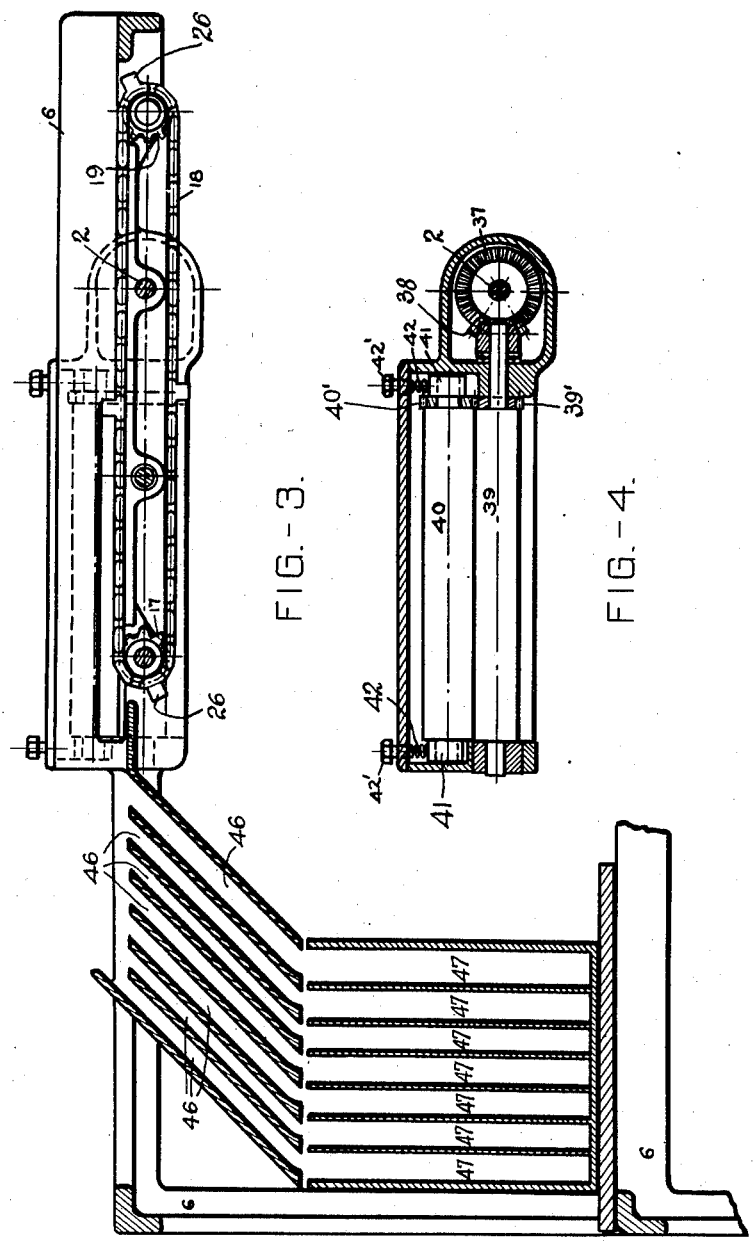

May 16, 1939.  J. R. MORRISON ET AL  2,158,727
PROCESS FOR SEPARATING HANDYSETS AND PILES AND APPARATUS THEREFOR
Filed July 22, 1938   8 Sheets-Sheet 4

John R. Morrison
Reuben E. Babcock   INVENTORS.
BY William W. Varney
ATTORNEY.

May 16, 1939.  J. R. MORRISON ET AL  2,158,727
PROCESS FOR SEPARATING HANDYSETS AND PILES AND APPARATUS THEREFOR
Filed July 22, 1938    8 Sheets-Sheet 5
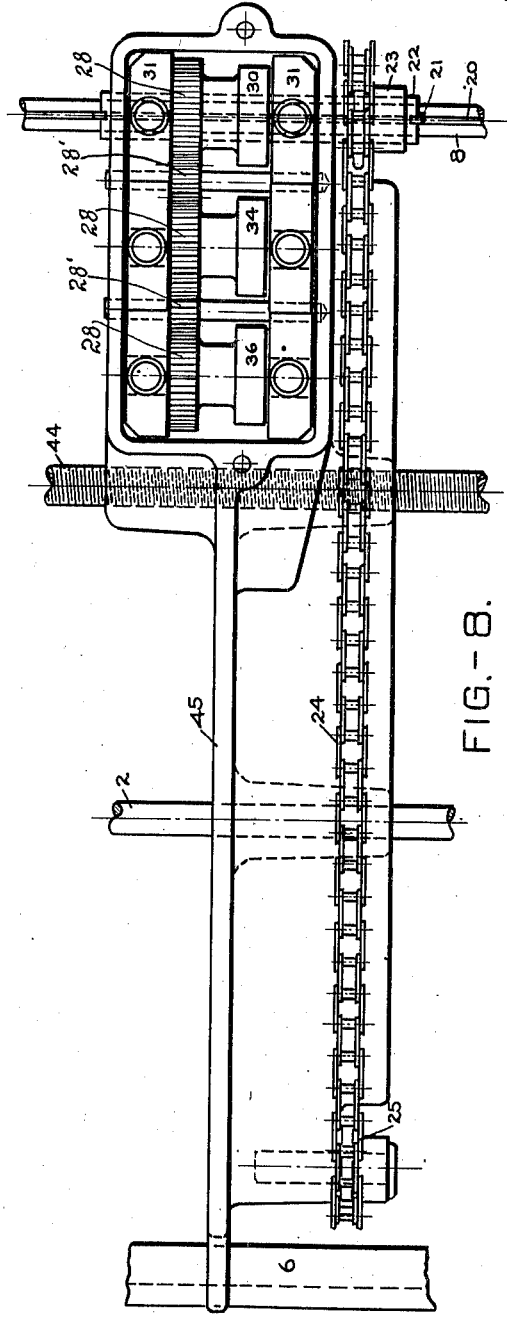
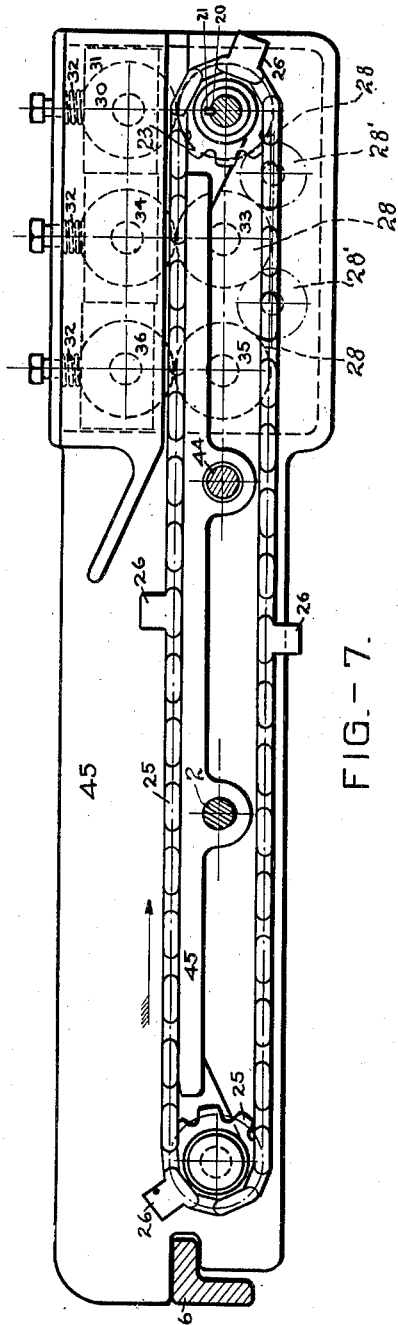
John R. Morrison
Reuben E. Babcock  INVENTORS.
BY William W. Varney
ATTORNEY.

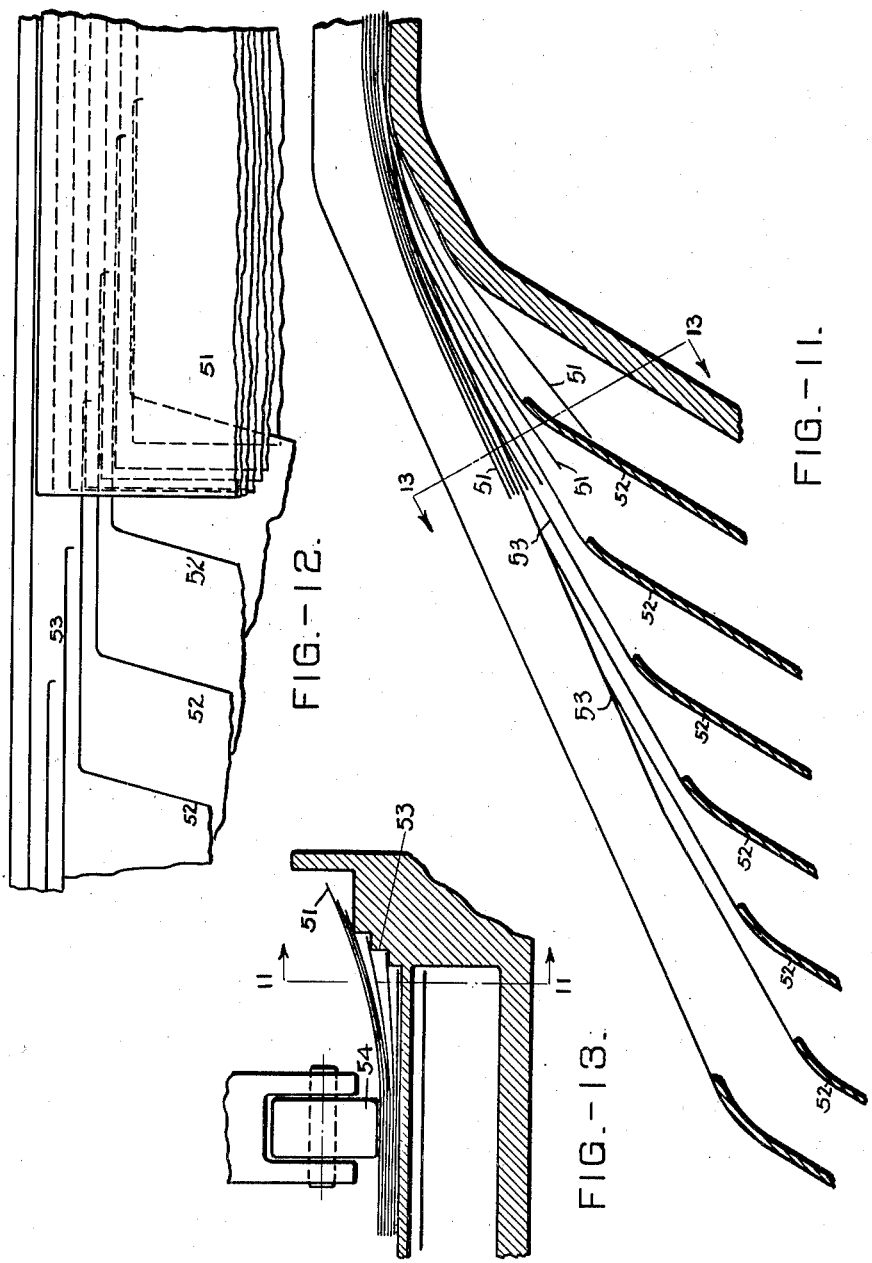

May 16, 1939. J. R. MORRISON ET AL 2,158,727
PROCESS FOR SEPARATING HANDYSETS AND PILES AND APPARATUS THEREFOR
Filed July 22, 1938 8 Sheets-Sheet 8
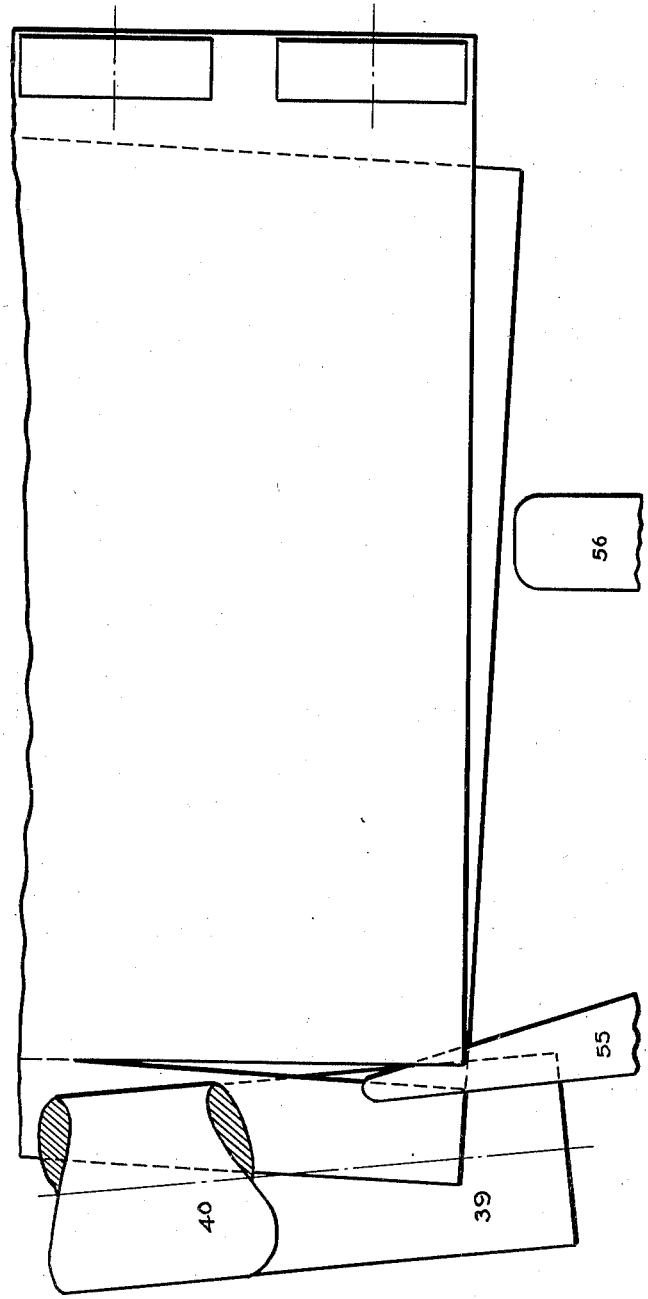
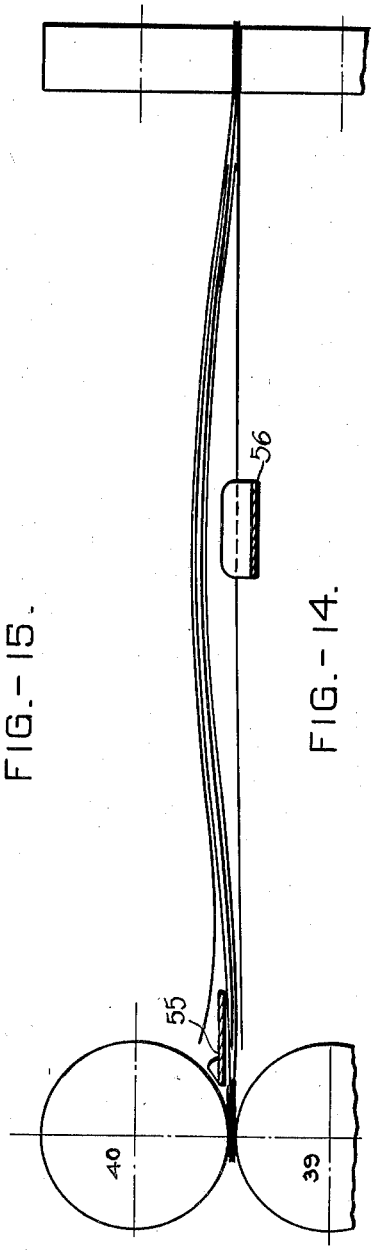
John R. Morrison
Reuben E. Babcock INVENTORS.
BY William W. Varney
ATTORNEY.

Patented May 16, 1939

2,158,727

UNITED STATES PATENT OFFICE 2,158,727

PROCESS FOR SEPARATING HANDYSETS AND PILES AND APPARATUS THEREFOR

John R. Morrison, Hampton, Va., and Reuben E. Babcock, Baltimore, Md.; said Babcock assignor to The Baltimore Salesbook Company, a corporation of Maryland Application July 22, 1938, Serial No. 220,662

13 Claims. (Cl. 164—84.5)

Handysets are known to the trade as comprising a plurality of forms interposed with carbon sheets, and piles are known to the trade as comprising a plurality of forms secured together at one end or edge without carbon sheets.

In the case of handysets containing the carbon sheets the sets are not secured together at one end, the carbon sheets not extending quite to that end, thereby being unsecured with the sets, and at the other end the carbon sheets and sets are secured together, the sets being perforated to facilitate tearing apart. The carbon sheets heretofore have been pulled out by hand after the sets have been filled in, and likewise the sets have been assorted or distributed by hand; also, in the case of the piles without interleaved carbon sheets the various sets have been separated and distributed by hand.

The object of this invention is to provide a machine to pull out the carbon sheets from the handysets.

A further object of our invention is an improved means for holding one end of the handyset while the other end is being torn off and separated together with the carbon sheets attached thereto.

A further object of our invention is an improved means for tearing out the carbon sheets from a handyset while the forms are being held at the other end.

A further object of our invention is an improved process for the pulling apart of handysets while being held at the opposite ends.

A further object of our invention is an improved process for the pulling apart of handysets while being held at two opposite edges and while progressively moving through a machine.

A further object of our invention is the providing of means for adjusting a machine to various size forms in the operations herein described.

A further object of our invention is an improved form-holder or means for allowing the forms to pass through the machine while being held and pulled apart.

A further object of our invention is the combining of a machine for separating handysets and piles with a machine or means for distributing the sets after being separated.

A further object of our invention is the providing of means for distributing the sets after they have been separated.

A further object of our invention is an improved holding means for holding a plurality of sets while progressively being operated upon.

A further object of our invention is an improved means for tearing parts of the handysets asunder while progressively being fed.

We would call attention to the fact that after the separation of the sets the distribution is independent of the fact whether or not the sets have had carbon sheets between them, as piles may be used without the carbon sheets, thus operating on sheets that are not secured together but simply distributed.

A further object of our invention is the process of distributing handysets.

With the foregoing and other objects in view, our invention consists of the methods employed, combination and arrangement of systems, apparatus and means as hereinafter specifically provided and illustrated in the accompanying drawings wherein is shown the preferred embodiment of our invention, but it is understood that changes, variations and modifications may be resorted to which come within the scope of the claims hereunto appended.

Figure 6:
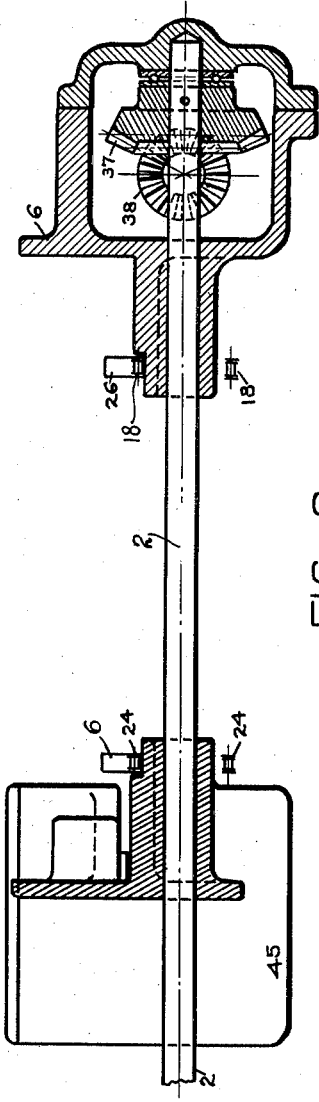
Figure 10:
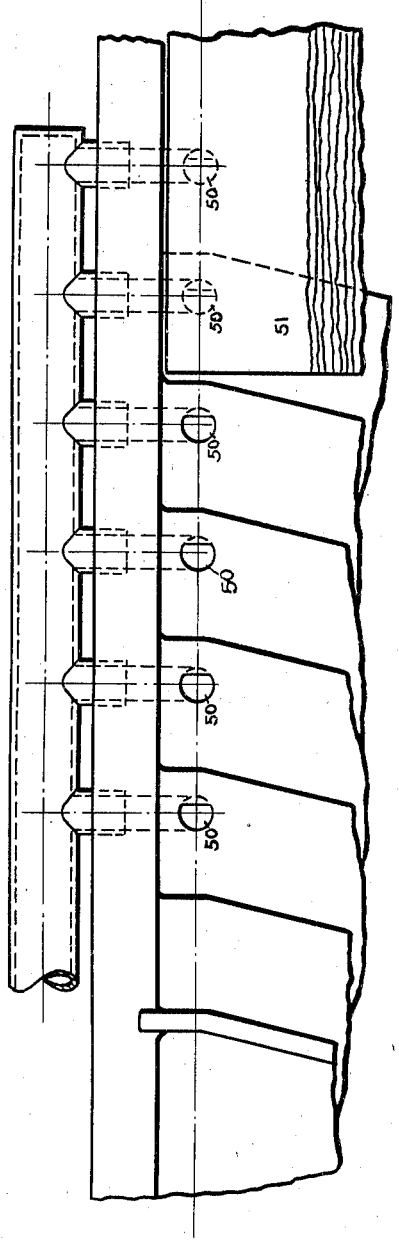
Figure 9:
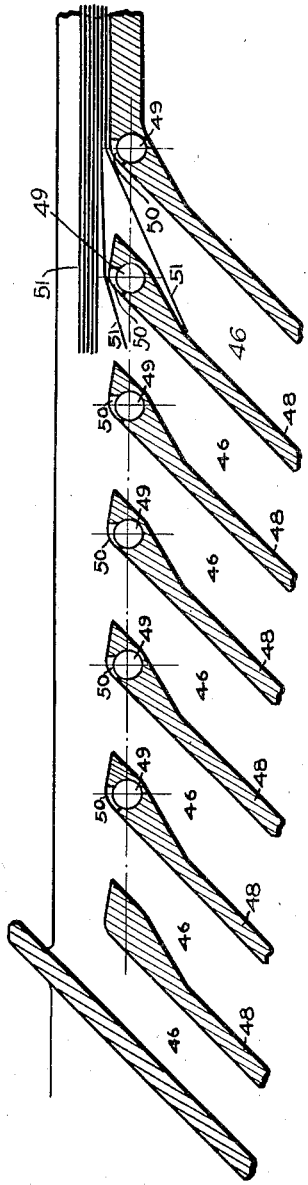

In the drawings of the herein-described embodiment of our invention, Figure 1 is a plan view of our improved machine for a handyset separator and distributor and in which the processes herein set forth may be practiced; Fig. 2 is a side view in elevation of the machine shown in Fig. 1, looking in the direction of the arrow 2; Fig. 3 is a sectional view taken through 3—3 of Fig. 1, looking in the direction of the arrows 3; Fig. 4 is a sectional view taken through 4—4 of Fig. 1, looking in the direction of the arrows 4, showing particularly the pulling or tearing rolls; Fig. 5 is a cross-section of the machine taken through 5—5 of Fig. 1, looking in the direction of the arrows 5; Fig. 6 is a cross-section of the machine taken through 6—6 of Fig. 1, looking in the direction of the arrows 6; Fig. 7 is a longitudinal sectional view of the machine taken through 7—7 of Fig. 1, looking in the direction of the arrows 7; Fig. 8 is an enlarged plan view of the holding rolls with the top of the case removed; Fig. 9 is an enlarged sectional view of the distributing mechanism taken through 9—9 of Fig. 1; Fig. 10 is a partial plan view of the distributing mechanism shown in Fig. 9.

Fig. 11 is an enlarged sectional view of a modified form of a distributing machine taken through 11—11 of Fig. 13, looking in the direction of the arrows; Fig. 12 is a partial plan view of the modified distributing machine shown in Fig. 11; Fig. 13 is a sectional view taken through 13—13 of Fig. 11; Fig. 14 is a plan view of another form of a modification of the distributing machine;

Fig. 15 is an enlarged partial plan view of the modified machine shown in Fig. 14.

We might state here that the drawings, especially the larger ones pertaining to the distribution, are more or less of a schematic type, the various details concerning well-known mechanical operations involved being omitted, among which we might enumerate the means for causing an air suction, or the conveying system extended to cover various size forms being distributed, and other mechanical details easily supplied by one skilled in the art.

Similar numerals refer to similar parts throughout the several views.

Motive power 1 is the motive power, as shown in Fig. 2 it is an electric motor which drives the main shaft 2 by means of belt 3 and pulley 4 secured to said shaft 2; shaft 2 operates in bearings 5 on main frame 6.

On shaft 2 is secured pulley 7 which pulley drives by means of belt 9 pulley 10, which pulley 10 runs free on shaft 8 and drives gear 11 also running free on shaft 8. Gear 11 drives gear 12, which gear 12 is secured to gear 13, said gear 13 driving gear 14 the latter gear being secured to shaft 8 and drives the same. Shaft 8 is journalled in the main frame 6 in journals 15 and 16.

Conveying mechanism

On shaft 8 is secured sprocket wheel 17 which drives the conveyer chain 18, said chain running idle over sprocket wheel 19. Sprocket wheel 23 is secured to sleeve 22 and drives conveyer chain 24 which conveyer chain runs idle over sprocket wheel 25. See Figs. 1 and 8.

Spaced on conveyer chains 18 and 24 are spaced stops 26 for engaging the handysets and piles passing through the machine.

Adjusting mechanism

Shaft 8 is provided with slot 20 in which slot operates gib-key 21 (see Fig. 8). 22 is a sleeve in which gib-key 21 is secured, thus permitting sleeve 22 to slide endwise on shaft 8 and rotate therewith. Sprocket wheel 23 is secured to sleeve 22 and drives the conveyer chain 24 as stated above (see Fig. 1). 43 is a hand-adjusting wheel operating screw 44 mounted in main frame 6 and adjusts relative therewith holding roll frame 45 by threaded nut 44$^1$, a part of frame 45, in which frame the holding rolls are operated.

Holding mechanism

Secured on sleeve 22 is holding-roll 27 (see Figs. 1 and 5). 28 is a gear secured to sleeve 22 and drives gear 29, which gear is formed with holding-roll 30. Holding-roll 30 and its attached gear 29 are resiliently and adjustably mounted in bearings 31 which bearings are under force of springs 32, which springs 32 are adjusted by adjusting screws 32$^1$. Gears 28 drive holding rolls 33, 34, 35 and 36 by means of intermediate gearing 28$^1$ (see Figs. 7 and 8).

Tearing or pulling mechanism

See Figs. 1 and 4. Bevel gear 37 is secured to shaft 2 and is driven thereby, and drives bevel gear 38 secured to shaft of tearing roll 39. Tearing roll 39 drives tearing roll 40 by means of gearing 39$^1$ driving pinion 40$^1$, and tearing roll 40 is resiliently and adjustably mounted with reference to said roll 39 by means of bearings 41 and springs 42, which springs 42 are adjusted by adjusting screws 42$^1$.

The line of perforations or torn edge of the sets is shown at 57—57 in Fig. 1. It will be noticed that this line does not come under the line of contact of the tearing rolls at its closed position, the carbon inserts consequently not being perforated are pulled out. The line 57 represents the torn edge where the separation of the handyset takes place, and it may be perforated or not as desirable. The line 57 may show a perforation, a creasing, or any means to definitely direct a tearing.

Distributing mechanism

Referring to Figs. 1, 3, 9 and 10, 46 are chutes leading into receptacles 47. Chutes 46 are separated by partition walls 48 in which walls are located suction pipes 49 which pipes are provided with openings 50 in said partition walls 48, preferably at the upper portion where the sheets contact the partition walls. These openings 50, when air is sucked therein while a sheet is passing over same, tend to cause said sheet to definitely and intimately contact said partition wall at that point, and if slightly below the general line of conveyance, will bend the sheet down and direct it into the adjacent chute.

The sheets being consecutively deflected as they pass over the respective partition walls, are thus distributed through the respective chutes into the respective containers.

In the drawings shown, only one opening 50 is shown in each partition wall 48, that being near the end of the partition wall and positioned so that air entering causes a suction, operating on one corner of the sheet passing over the same. In wide sheets it may be desirable to have a plurality of openings 50 distributed along the upper edge of the walls 48 for suction purposes. Of course, these openings 50 are connected with any means for causing a partial vacuum, or sucking of air therethrough.

Referring to Figs. 11, 12 and 13, a modification of the distribution mechanism is shown to accommodate offset piles or handysets whereby the same may be distributed. In this case, the perforations are offset whereby the separated sheets are fed in an offset position relatively and are successively separated by steps as shown in Figs. 12 and 13, in which figures the sheets 51 are offset as shown by the modified partition walls 52 the edges of which walls are shown as offset as 53. 54 is an idle weighted roller to push the sheets down to contact the partition walls.

Referring to Figs. 14 and 15 which show another modification of the device particularly adapted to handysets having two or three sheets, in proximity to the tearing rolls 39 and 40 a picking finger 55 secured to main frame 6 of the machine is positioned. Taking advantage of the fact that while the sheets are being torn on the skew a buckling takes place, the picking finger 55 is positioned to enter under the top sheet and separate the same from the others. 56 is another finger entering over the bottom sheet. Fingers 55 and 56 are supported from the side so as not to interfere with the passage of the sheets over or under the same and so formed and positioned as to direct the sheets into their respective chutes. As shown in these views, three form sheets are involved together with the two necessary carbon sheets.

Operation of machine

The operation of our machine is as follows:

The handysets, or piles, are fed to the conveyor chains 18 and 24 either singly, if to be assorted, or may be fed in piles if simply pulled.

The conveyer chain conveys the sets or piles, either in piles or singly, controlled by means of the lugs 26 to holding rolls 27, 30, 33, 34, 35 and 36, which rolls hold the free ends of the sets or piles and convey the same in a right line while passing through the machine. The other end of the sets or piles, as conveyed by the holding rolls and the conveyer as far as it goes, are caught by the tearing rolls which operate at an angle, and begin to immediately tear the sets as they progress, the sets preferably being perforated along the line on which it is desired the tearing shall occur, and the sets or piles are held and fed by the holding rolls.

The tearing rolls, in addition to tearing the sheets along their perforations, line 57—57, of Fig. 1, pull the carbon sheets out of the sets and deposit the same into a suitably placed receptacle alongside the machine, the separated forms continuing on the conveyer, are finally removed therefrom or distributed into receptacles as desired.

Having thus described our invention, what we claim and desire to secure by Letters Patent is:

1. The process of removing carbon sheets interleaved in a handyset consisting of, conveying continuously the handyset and interleaved carbon sheets along a predetermined path and while being so conveyed gripping the edge of the handyset not containing the carbon inserts and while so being held and conveyed tearing the opposite edge of the sheets embracing the carbon sheets away from the handyset and removing the carbon sheets while being so conveyed.

2. The process of removing carbon sheets interleafed in a handyset consisting of, conveying the handyset and interleaved carbon sheets along a predetermined path, gripping the edge of the handyset not containing the carbon inserts and tearing the opposite edge of the sheets embracing the carbon sheets away from the handyset and removing the carbon sheets.

3. A machine for removing carbon sheets interleaved in a handyset comprising, means for conveying continuously the handyset containing the interleaved carbon sheets along a predetermined path and while so being conveyed means for gripping the edge of the handyset not containing the carbon inserts, and while so being held and conveyed, means for tearing the opposite edge of the sheets embracing the carbon sheets away from the handyset and means for removing the carbon sheets while being so conveyed.

4. An apparatus for automatically separating interleaved sheets from sheets in an aggregation consisting of, means for holding one end of the aggregation of the sheets without the interleaved sheets and means for holding the other end of the aggregation and interleaved sheets and means for automatically separating said other end and removing the interleaved sheets so that the aggregated sheets are separated and are without the interleaved sheets.

5. An apparatus for separating interleaved sheets from sheets in an aggregation consisting of, means for holding one end of the aggregation of the sheets without the interleaved sheets and means for holding the other end of the aggregation and interleaved sheets and means for separating said other end and removing the interleaved sheets so that the aggregated sheets are separated and are without the interleaved sheets.

6. In a machine for separating interleaved sheets from intermediate sheets in an aggregation consisting of, means for holding the loose end of the aggregated sheets without holding the interleaved sheets and while so holding means for progressively feeding the aggregation along a fixed path, and while so feeding means for grasping the opposite end of the aggregation and rendering asunder the sheets thereof and removing the interleaved sheets therewith, thereby progressively tearing the said aggregated sheets progressively as the same are fed along said fixed path, consisting of pinching rolls operated to pull said sheets asunder, said rolls being set at an angle with reference to the path of progress of said aggregation while being fed so that a tearing begins immediately at one point and is progressively continued as the sheets advance and the interleaved sheets are progressively removed.

7. A machine for removing carbon sheets interleaved in a handyset comprising, means for conveying the handyset containing the interleaved carbon sheets along a predetermined path, and while so being conveyed means for gripping the edge of the handyset not containing the carbon inserts, and while so being held and conveyed means for tearing the opposite edge of the sheets embracing the carbon sheets away from the handyset, means for removing the carbon sheets while being so conveyed, and means for distributing the leaves of the handyset after the carbon sheets have been removed into desired locations.

8. In a machine for separating interleaved sheets from aggregated sheets in an aggregation consisting of, means for holding the loose end of the aggregated sheets without holding the interleaved sheets consisting of a plurality of contacting rolls gripping said end and directing the said aggregation along a predetermined path while holding said end, and while holding said sheets means for progressively feeding the aggregation along a fixed path, and while so feeding means for grasping the opposite end of the aggregation and rending asunder the sheets thereof and pulling the interleaved sheets therewith.

9. An apparatus for separating interleaved sheets from sheets in an aggregation consisting of, means for holding one end of the aggregation of the sheets without the interleaved sheets, means for holding the other end of the aggregation and interleaved sheets, means for adjusting said two holding means relatively to accommodate different sized sheets, and means for separating said other end of said sheets so held and the interleaved sheets from the aggregation.

10. An apparatus for separating interleaved sheets from sheets in an aggregation consisting of, means for holding one edge of the aggregation of the sheets without the interleaved sheets and while so held means for advancing the aggregation along a fixed path, means for holding the opposite edge of the aggregation and the interleaved sheets and means for removing the other edge of the aggregation and the interleaved sheets progressively as the aggregation is so advanced.

11. An apparatus for separating interleaved sheets from sheets in an aggregation consisting of, means for holding one edge of the aggregation of the sheets without the interleaved sheets and while so held means for advancing the aggregation along a fixed path, means for holding the opposite edge of the aggregation and the interleaved sheets and means for removing the other edge of the aggregation and the interleaved sheets progressively as the aggregation is so advanced consisting of, a tearing means operating progressively on said aggregated sheets and the interleaved sheets as the same is so advanced whereby the said aggregated sheets are buckled at the entering edge.

12. In combination, an apparatus for separating interleaved sheets from sheets in an aggregation, means for advancing said aggregation through said machine and means for distributing said sheets after the separation of the interleaved sheets into predetermined receptacles.

13. An apparatus for separating interleaved sheets from sheets in an aggregation consisting of, means for holding one edge of the aggregation of the sheets without the interleaved sheets and while so held means for advancing the aggregation along a fixed path, means for holding the opposite edge of the aggregation and the interleaved sheets and means for removing the other edge of the aggregation and the interleaved sheets progressively as the aggregation is so advanced consisting of, a tearing means operating progressively on said aggregated sheets and the interleaved sheets as the same is so advanced whereby the said aggregated sheets are buckled at the entering edge, and means for segregating the sheets of the aggregation remaining after the separation of the interleaved sheets into predetermined receptacles according to the buckling of said sheets.

JOHN R. MORRISON.
REUBEN E. BABCOCK.